United States Patent [19]

Gonzales-Oliver

[11] Patent Number: 4,731,348
[45] Date of Patent: Mar. 15, 1988

[54] ALUMINOSILICATE OPTICAL GLASS

[75] Inventor: Carlos Gonzales-Oliver, Geneva, Switzerland

[73] Assignee: Batelle Memorial Institute, Geneva, Switzerland

[21] Appl. No.: 800,596

[22] PCT Filed: Mar. 4, 1985

[86] PCT No.: PCT/CH85/00038
§ 371 Date: Nov. 7, 1985
§ 102(e) Date: Nov. 7, 1985

[87] PCT Pub. No.: WO85/03928
PCT Pub. Date: Sep. 12, 1985

[30] Foreign Application Priority Data

Mar. 7, 1984 [CH] Switzerland ............ 1131/84

[51] Int. Cl.$^4$ .............. C03C 3/062; C03C 3/083
[52] U.S. Cl. ....................... 501/54; 501/37; 501/55; 501/68
[58] Field of Search ............ 501/37, 54, 55, 68

[56] References Cited

U.S. PATENT DOCUMENTS 3,843,228  10/1974  Yoshiyagawa et al. ............ 501/37
4,495,298   1/1985  Yamagishi et al. .................. 501/55

FOREIGN PATENT DOCUMENTS

85/03928  9/1985  PCT Int'l Appl. ............... 501/68

Primary Examiner—Steven Capella
Attorney, Agent, or Firm—Cushman, Darby & Cushman

[57] ABSTRACT

Optical glasses based on silica and alumina, rich in modifying metals such as silver, thallium and cesium. The exchange by cathodic migration in a melted salt bath of said modifying metals by metals such as K, Na and Li, exchange which leads to a corresponding variation of the refraction index of the glass according to a certain predetermined profile, is performed very efficiently and rapidly. Such an exchange is performed either on the finished glass or on a microporous form thereof.

6 Claims, 1 Drawing Figure

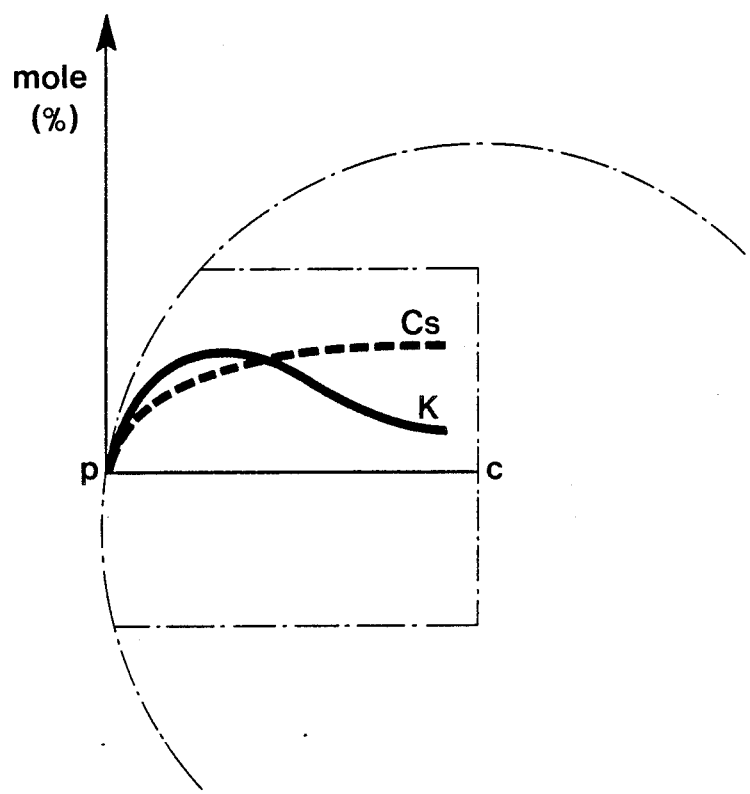

ALUMINOSILICATE OPTICAL GLASS

The present invention relates to aluminosilicate optical glass containing at least one oxide of a monovalent modifying metal chosen from among Tl and Ag. The glass, which may also contain cesium, is characterised by its composition which, comprises 60 to 95 mole % silica, at least 2 mole % of alumina and at least 2 mole % of one or more oxides of the aforementioned metals. In a variant, the molar proportions of $Al_2O_3$ and oxides of modifying metals are above 3 mole % and the proportion of $SiO_2$ is below 94 mole %.

Glass of this kind is particularly useful in the sector of waveguides for optical transmission, since under certain conditions it is adapted to exchange the monovalent metal cation for a foreign cation, which operation results in a change in the refractive index of the thus-treated glass. The term waveguide is used to mean e.g., both optical fibres and microlenses capping optical fibres and used for injecting light signals into them.

As is known, numerous studies have recently been made to develop optical glass having a variable refractive index for manufacturing microlenses and optical fibres having low loss in transmission. This is because when the index of an optical fibre decreases radially from the centre towards the exterior in accordance with a given function, the transmitted signals undergo very little attenuation or phase-shifting. To obtain these conditions, the variation in the index preferably conforms to a function such as $n = n_o(1 - ar^2)$ where $n_o$ is the index at the centre of a fibre of radius r and a is a constant associated with the kind of glass used.

Waveguides having the aforementioned properties are usually made starting with glass having a uniform index and given a suitable shape (e.g., a rod which can subsequently be moulded into a micro-lens or drawn in the form of a fibre). The composition of the glass comprises one or more metals capable of diffusing towards the exterior with said one or more metals being gradually replaced by another metal, the presence of which results in a refractive index different from that of the original glass. Research has shown that the effect of a metal on the refractive index of a given glass is related to the electronic polarizability (Å) divided by the ionic radius ($Å^3$) of the metal. The quotient is relatively low for certain metals which have only a slight influence on the refractive index, e.g., the alkali and alkaline-earth metals (0.06 for Li; 0.56 for K; and 0.2 for Mg), but is appreciably higher for metals such as cesium (0.744), thallium (1.572) and silver. The effect of the oxides of these metals on the refractive index is of considerably greater significance. If a rod of glass containing suitable proportions of the latter metals, which have a relatively high molecular weight, is placed under suitable conditions, e.g., in a bath of molten salt at a temperature sufficient to promote migration of the metals in cationic form (a temperature in the order of 400°-800° C.), the metals are exchanged for the metal or metals contained in the molten salt bath. If the salt bath contains cations for which the ratio $Å/Å^3$ is below the corresponding ratio of the metal in the glass subjected to exchange, the introduced cations will lower the index of the glass, with the amount of reduction depending on the degree of exchange in the zone under consideration. Since the diffusion rate progressively decreases with distance from the periphery towards the centre of the rod, the progressive variation in index will follow a similar function, increasing towards the centre and approaching the aforementioned ideal function to an extent depending on the nature of the glass, the diffusion medium and the operating conditions.

Detailed information on these questions will be found in the following documents:

Glass Technology (1979), 20(5), 166-9; Applied Optics (1980), 19(7), 1092-95; Thin Solid Films (1976), 36(2), 493-6; Applied Physics (1975), 6(2), 223-8; Journal of the American Ceramic Society 54 (7), 321-26 (1971); Japan Society of Applied Physics 39 (1970), 63-70; FR-A-2 488 413; 2 169 860; U.S. Pat. Nos. 3,853,673; 3,873,408; 3,859,103; DE No. 3 008 656; GB No. 2 084 990; JP No. 82 42 547; (CA 97 42991); JP No. 82 56,353 (CA 97 77452 and JP No. 81 44 023 (CA 96 204305).

Also, the Journal of the American Ceramic Society describes glass containing 65 to 90 mol % $SiO_2$, 5-25 mol % $Al_2O_3$ and 5-20 mol % CsO. This glass is obtained by the fusion of oxides, a technique difficult to use in obtaining highly uniform glass owing to its high viscosity when hot.

The document published in Chemical Abstracts CA 100, 90266 b (1984), describes the manufacture of photochromic glass containing silver halides as the photochromic substance. This glass is quite distinct from the glass of the present invention where silver occurs in oxide form, and the silver oxide is an integral part of the glass in which it is incorporated.

Document CA 97, 774 60 k (1982), describes the doping of aluminosilicate glass with a concentration gradient, using the salts of Pb, Cs or Tl. The glass in question does not have a uniform composition, such as that of the glass of the present the invention.

FR No. 2 175 934 describes the manufacture of drawable glass preforms having a refractive index which can be varied by ionic exchange in a molten salt bath. The glass used as starting materials for the exchange is described as including borosilicate glass containing cesium, thallium and, if required, alumina. By contrast, the glass according to the present invention does not contain boron oxide, which gives it additional stability in applications to telecommunications.

It has unexpectedly been found that rods obtained from the aluminosilicate glass of the present invention which does not contain boron and which is rich in thallium or silver oxide and which also contains cesium if required, can have the aforementioned metals exchanged for an alkali metal such as sodium, lithium or potassium in a molten salt bath under operating conditions which are relatively easy to check and which, yield preforms having a refractive index which varies in a more pronounced manner than with conventional optical glass (the differences between the index at the centre and at the periphery being from 1 to 15%). The variation in accordance with a radial function is unexpectedly close to the ideal function of the reciprocal of the square of the radius (parabola). Also, the preforms are easy to mould or draw into optical fibres by conventional methods, the quality of the fibres being excellent owing to the low tendency to microfissuration of the glass of the present invention. Finally, the high proportions both of alumina and of diffusable metal or metals in the glass according to the present invention results in an open structure favouring a very rapid cation exchange and thus saving energy in processing.

Preferably the glass according to the invention contains from 2 to 20 mol % $Al_2O_3$ and 2 to 20 mol % of oxides of Tl, Cs or Ag; silver and thallium can be individually present and cesium can be mixed with either or both of the two proceeding metals. However, these limits are not obligatory and can be exceeded in certain special cases. In a variant, for example, the compositions by weight percent may be expressed in the order $SiO_2$; $Al_2O_3$; and oxides of Ti or Ag or mixtures thereof with or without cesium can be expressed as follows: 60-85; 5-20; 5-20 or 50-80; 10-25; 10-25. Of course the molar proportions of $Al_2O_3$ and modifying metals are not necessarily equal, since an excess of one can offset a deficiency of another.

The glass according to the present invention is preferably prepared by the "sol-gel" method described e.g., in the following references: J. Mat. Sciences 13 (1978), 865-70; GB No. 2 084 990. The process consists of preparing a mixture of the metal ingredients in the form of certain of their organic compounds (preferably lower alkoxides) in a suitable hydrophilic solvent, and progressively converting the mixture into a gel of sufficiently firm consistency to be manipulated, by controlled hydrolysis of the organic compounds and slow evaporation of the solvents. The gel is then dried and, by heating to a relatively low temperature (900°-1200° C.), is sintered to some extent or densified into homogeneous, exceptionally pure glass. This method (i.e., using relatively low densification temperatures) is particularly suitable for the glass of to the invention since oxides of Tl, Cs and Ag are very volatile at the temperatures normally used for conventional fusion processes (i.e., 1500° C. or more) in which case the losses of oxides are considerable and are incompatible with economic manufacture.

Another major advantage of the sol-gel process is that additional doping with thallium, cesium or silver can be brought about during the stages before final densification, when the structure changes from a porous-translucent state into perfectly transparent glass. The reason is that at the preliminary stages when the material obtained by gelification of the solution of alkoxides is in the form of a rigid gel and is, condensed to a varying extent (depending on the drying and densification temperatures to which it has already been submitted), the material is sufficiently porous for its interstices to absorb an additional amount of the doping metals (supplied, e.g. from a molten salt bath into which the porous preform is dipped for a given time). With regard to the time required for this operation, either the time and temperature can be made sufficient for the additional metal to be uniformly distributed throughout the porous material, or the time can be shortened, in which case the added material will be distributed in accordance with a concentration gradient. Of course, after the extra metal has been added, the material is again heated to a sufficient temperature to bring about final densification and vitrification.

Similar considerations apply to the final exchange of monovalent modifying metals such as Tl, Cs or Ag by alkali or alkaline-earth metals in order to obtain glass which has a variable refractive index that decreases radially from the centre towards the periphery. The exchange can be brought about either on the preform after it has been completely vitrified and densified (as described hereinbefore) or on the glass while it is still opalescent and porous, i.e., during the step preceding final vitrification at temperature between about 900° C. and 1200° C. In the latter case, the exchange can occur more quickly than in the case of finished glass, since diffusion occurs more rapidly in a porous structure than in a non-porous structure. Of course, if the exchange is brought about at this preliminary stage, manufacture of the preform is supplemented by a heating step terminating in the complete coalescence of the glass, which will then immediately have a refractive index gradient suitable for the manufacture of micro-lenses or optical fibres.

The following Examples illustrate the invention.

To understand the Examples, reference should be made to the drawing, which shows the radial curve of variation of the proporrions of Cs and K in the cross-section of a rod made of the glass described in Example 2.

EXAMPLE 1

Three solutions A, B and C were prepared by mixing the following ingredients:

| | | |
|---|---|---|
| A: | Ethyl silicate (Si(OEt)$_4$) | 46.5 g |
| | Ethanol (EtOH) | 30 g |
| B: | Acetylacetic ester - dibutylaluminium complex (AlBu$_2$AA) | 11.9 g |
| | Isopropanol (iPrOH) | 10 g |
| | Acetylacetone (AcAc) | 0.6 g |
| C: | Silver perchlorate (AgClO$_4$) | 8.2 g |
| | EtOH | 20 g |
| | Toluene | 30 g |
| | Benzene | 10 g |

Solutions A and B were mixed, after which solution C was added to the mixture. The result was a starting solution (SAA) containing the following ingredients according to percentage by weight: EtOH 29.9; Si(OEt)$_4$ 27.8; iPrOH 6; 2,4-pentanedione 0.4; AlBu$_2$AA 7.1; AgClO$_4$ 4.9; toluene 17.9; and benzene 6.0.

Next, solution SAA was gelified by adding various water-alcohol mixtures as follows (v/v):

i = 15% $H_2O$ — 85% EtOH;
ii = 30% $H_2O$ — 70% EtOH;
iii = 60% $H_2O$ — 40% EtOH;
iv = 30% $H_2O$ (containing 0.2% by weight of polymethyl methacrylate (PMMA)) — 70% EtOH.

Solutions i to iv were added to portions of solutions AA and the resulting mixtures were left for 2 hours at ambient temperature so as to gel.

The amounts of each of solutions i to iv added to portions of solution SAA are shown in Table I hereinafter.

TABLE I

| Test No. | Solution SAA (ml) | Solution i to iv (ml) |
|---|---|---|
| a | 50 | i 50 |
| b | 40 | i 60 |
| c | 33.3 | i 66.6 |
| d | 25 | i 75.0 |
| e | 50 | ii 50 |
| f | 40 | ii 60 |
| g | 33.3 | ii 66.6 |
| h | 66.6 | iii 33.3 |
| i | 50 | iv 50 |
| j | 40 | iv 60 |

These gels were obtained in cylindrical borosilicate glass vessels having suitable dimensions for producing, after release from the mould, cylinders of gel about 10-20 cm long and about 2 cm in diameter. The cylinders were dried in air for 240 h in an oven brought to 60°–80° C. until the resulting material was translucent, hard and rigid. Next, test-pieces e and j were selected and subjected to the following heating operations in a stream of oxygen:

1. Heat-treating at a temperature of from 20° C. to 600° C. at the rate of 1°/min, then 4 hours at 600° C.;
2. Heat-treating at a temperature of from 600° C. to 800° C. at the rate of 1°/min, then 4 hours at 800° C.;
3. Heat-treating at a temperature of from 800° C. to 980° C. at the rate of 1°/min, then 1 hour at 980° C.;
4. Cooling to 900° C., followed by heating to 1030° C. at the rate of 5°/min and finally maintaining at the latter temperature for 1 hour. The product was a rod of monolithic, transparent homogeneous glass having the following properties:

Analysis (by weight): $SiO_2$ (76.1%); $Al_2O_3$ (10%); and $Ag_2O$ (22.8%).

(mole %): $SiO_2$ (85); $Al_2O_3$ (7.5); $Ag_2O$ (7.5).

Density: 2.7; refractive index (n)=1.51.

EXAMPLE 2

In a process similar to that described in Example 1, a solution of $Si(OEt)_4$ in absolute alcohol was mixed with a solution containing an acetylacetic ester and aluminium di-(sec)butylate complex $(Al(s.BuO)_2AA)$ dissolved in isopropanol and acetyl acetone, with a solution of caesium ethylate (CsOEt) in absolute ethanol, and with a solution of TlOEt in absolute ethanol. The entire operation was designed to produce a homogeneous mixture (SAC2) having the following percentage composition by weight: EtOH 43.50; $Si(OEt)_4$ 26.46; iPrOH 14.5; acetylacetone 0.3; $Al(S.BuO)_2AA$ 9.59; CsOEt 4.27; and Tl 1.50.

Gelification was brought about by adding a mixture consisting of 4.5 g $H_2O$, 4.1 g of 0.2N ammonia solution and 50.7 g alcohol to 40 ml of the previously-mentioned solution. In general, it was found that usable gels were obtained from the alkoxide solution SAC2 by adding about 5 mole $H_2O$ and 0.01 mole $NH_4OH$ per mole of alkoxides.

In the present case, a useful gel was obtained after 2 hours at ordinary temperature. The gel was dried as in Example 1, and the temperature was subsequently slowly increased from 40° to 100° C. in a time period of about a week. After the gel was dry and hard and had been taken from the oven, it was given the following heat-treatment:

Heat-treating at a temperature of from 20° C. to 600° C. at 3°/min, then 4 hours at the same temperature;
2. Heat-treating at a temperature of from 600° C. to 800° C. at 1°/min, then 4 hours at 800° C.;
3. Heat-treating at a temperature of from 800° C. to 1030° C. at 1°/min, then 1 hour at 1030° C.;
4. From 1030° C. to 1050° C. at 1°/min, then 1 hour at 1050° C.

Finally, the rod was heated at 1200° C. for half an hour in a stream of helium, thus obtaining a transparent glass test-piece without cracks and having the following composition:

% by weight: $SiO_2$ 53.8; $Al_2O_3$ 11.4; $Cs_2O$ 25.3; and $Tl_2O$ 9.5

Mole %: $SiO_2$ 80; $Al_2O_3$ 10; $Cs_2O$ 8; and $Tl_2O$ 2.

Density: 2.8; n=1.50.

EXAMPLE 3

0.25 ml water in 4.75 ml EtOH were added to 40 ml of solution SAC2. In contrast to Example 2, the amount of water used in this case was only one-eighth of that used in Example 2 to bring about gelification. Next, 0.15 ml of 0.5N HCl were added and the mixture was left to stand for 2 days during which time the gel formed.

After release from the mould to dry for 14 days at 68° C. under the conditions described in the preceding Examples, the test-pieces were given one or the other of the following heat-treatments:

I.
1. 25°–650° C. at 1°/min; 2 hours at 650° C.
2. 650°–930° C. at 1°/min; 5 hours at 930° C.

II.
1. 35°–450° C. at 1°/min; 30 hours at 450° C.
2. 450°–750° C. at 1°/min; 10 hours at 750° C.
3. 750°–920° C. at 1°/min; 2 hours at 920° C.

III.
1. 25°–650° C. at 2°/min; 2 hours at 650°
2. 650°–850° C. at 1°/min; 6 hours at 850°
3. 850°–1030° C. at 1°/min; 2 hours at 1030° C.

The samples given heat-treatment I hereinbefore gave a transparent but severely cracked glass which disintegrated into particles on impact. The test-pieces obtained by treatments II and III were likewise cracked and opalescent (not transparent), probably as a result of surface crystallization of the glass. There was no observable "bloating", i.e., swelling of material or formation of bubbles resulting from release of vaporized volatile products.

A pressure-sintering mould was filled with particles ("crumbs") of glass obtained from the fragments of a test-piece given treatment II hereinbefore, and the material was compressed at 4 t/cm² at a temperature of 1200° C. for a time period of 60 minutes. Preforms were obtained which were similar to those in Example 2. The sintering temperature was appreciably lower than the normal glass-melting temperature and was insufficient to volatilize an appreciable quantity of cesium oxide or thallium oxide.

EXAMPLE 4

The process of Example 1 was used to prepare the following solutions D, E and F from the following ingredients (solution F of thallium ethylate was obtained by dissolving this organometallic substance with vigorous agitation in isopropanol and butanol under dry nitrogen in the presence of $P_2O_5$ in a glove-box. During the addition process, crystals formed and gradually redissolved).

| | | |
|---|---|---|
| D. | $Si(OEt)_4$ | 190.42 g |
| | EtOH | 203.87 g |
| E. | $AlBu_2AA$ | 48.76 g |
| | AcAc | 2.095 g |
| | iPrOH | 113.17 g |
| F. | TlOEt | 40.24 g |
| | BuOH | 75.0 g |
| | iPrOH | 40.0 g |

Solutions E and F were successively added to solution D, yielding a mixture (SAT 4) containing the following proportions by weight of the previously-mentioned ingredients:

EtOH 28.6; $Si(OEt)_4$ 26.7; iPrOH 21.5; BuOH 10.5; acetylacetone 0.3; $AlBu_2AA$ 6.8; and TlOEt 5.6.

Various proportions of 80/20 (v/v) aqueous ethanol were added to 100 ml of the mixture SAT4 and, after intimate mixing, were left to stand at ambient temperature until gels formed. The starting conditions and results are shown in Table II hereinafter:

TABLE II

| Test | H$_2$O/EtOH solution (ml) | Gelling time (h) |
|---|---|---|
| 1 | 50 | 5.4 |
| 2 | 100 | 4.5 |
| 3 | 150 | 3 |
| 4 | 200 | 3 |

After the gel test-pieces had been released from the mould and they were dried in an oven for 3 days with, the temperature slowly but regularly increased to 55° during drying. Following drying transparent, slightly bluish rods of pure dry gel were obtained.

The test-pieces were given the following heat-treatment in air:
20°–920° C., 1° C./min; 2 hours at 920° C.
920°–980° C., 6° C./min; 2 hours at 980° C.

The treatment yielded colourless glass test-pieces, completely transparent and free from air bubbles. There were a few traces of cracks. Other samples were also prepared and densified under the following conditions:
20°–800° C., 1° C./min; 4 hours at 800° C.
800°–920° C., 1° C./min; 5 hours at 920° C.
920°–950° C., 1° C./min; 5 hours at 950° C.

These test-pieces contained 85 mole % of SiO$_2$ and 7.5 mole % of each of the remaining constituents, Al$_2$O$_3$ and Tl$_2$O. Density was calculated to be 3.2, n=1.55. They did not have any cracks.

EXAMPLE 5

The methods described in the preceding Examples were used to prepare glass having the composition shown in Table III hereinafter, in the form of preforms for drawing into optical fibres.

TABLE III

| Test-piece | SiO$_2$ % mole | SiO$_2$ % weight | Al$_2$O$_3$ % ml. | Al$_2$O$_3$ % wt. | Cs$_2$O % ml. | Cs$_2$O % wt. | Tl$_2$O % ml. | Tl$_2$O % wt. | Ag$_2$O % ml. | Ag$_2$O % wt. |
|---|---|---|---|---|---|---|---|---|---|---|
| 1 | 66.6 | 41.9 | 16.6 | 17.8 | | | | | 16.6 | 40.3 |
| 2 | 66.6 | 31.3 | 16.6 | 13.3 | | | 16.6 | 55.4 | | |
| 3 | 70 | 24.8 | | | | | 30 | 75.2 | | |
| 4 | 70 | 45.7 | 15 | 16.6 | | | | | 15 | 37.7 |
| 5 | 72.8 | 38 | 13.6 | 12 | | | 13.6 | 50 | | |
| 6 | 70 | 34.7 | 15 | 12.6 | | | 15 | 52.6 | | |

Test-piece 3, without alumina, was prepared for control purposes; its behaviour during the previously-described cation exchange reactions was different from that of the glass of the present invention.

EXAMPLE 6

This example describes the conversion of the test-pieces of the previous Examples into waveguide preforms having a radially variable refractive index.

A glass test-piece prepared according to the method of Example 2 (diameter 3–5 mm) was immersed for 5 hours in a bath of molten KNO$_3$ maintained at 600° C.

After the test-piece had been removed from the bath, it was found by overall analysis of the glass composition that about 50% (mole %) of the cesium and thallium had been replaced by potassium. Analysis was made via the energy (X-ray) dispersion spectrum, following the usual method. According to this method, the test-piece is irradiated by an electron beam and the X-rays produced by the secondary electrons are recorded on a spectrum according to their energy (keV).

The resulting diagram shows the peaks due to the presence of the various metals in the glass analyzed as described hereinbefore. The height of the peaks provides a rough idea of the average relative proportions of metal constituents present. It was thus possible to observe the formation of potassium peaks at 3.313 and 3.589 KeV.

The accompanying drawing diagrammatically shows the radial variation in the height of the main K and Cs peaks when the same analysis is made by scanning a cross-section of the glass test-piece, in a direction connecting the periphery p to the centre c of the cross-section. A similar variation is observed with regard to thallium. A corresponding measurement of the refractive index, depending on the simultaneous presence of Cs, Tl and K, shows that the variation therein follows a curve very close to the desired parabola.

The glass obtained in tests 1, 2 and 4–6 in Example 5 was subjected to cation exchange as previously described, giving similar results. Glass containing silver was particularly satisfactory with regard to the variation in the gradient of the refractive index. Depending on the extent of exchange, i.e., the duration of treatment which can be continued for up to 10–20 hours, the gradient can be up to 15% between the centre and the periphery of the rod.

Cation exchange treatment was also carried out in a bath of molten metal on glass test-pieces prepared by the previously-mentioned methods but before final densification. For example, the treatment was applied to test-pieces having various degrees of porosity as obtained after the heating steps 1, 2 and 3 described in Example 1. In these cases, after the exchange operation in a molten salt bath, the glass was finally densified in a manner corresponding to the heating operation 4 in Example 1. When cation exchange was brought about in a still-porous glass rod, the exchange occurred more quickly and at a greater depth than with completely densified glass. Consequently, the variation curve of the refractive index between the periphery and the centre of the rod can depart from the ideal curve if treatment is too prolonged or if the temperature is too high. The precise conditions for obtaining a given curve can easily be obtained in individual cases by routine tests.

I claim:
1. An aluminosilicate optical glass without boron oxide, characterized in that it contains:
    (a) 60–95 mole % of silica;
    (b) at least 2 mole % of alumina; and
    (c) at least 2 mole % of a modifying metal component selected from the group consisting of
        (i) an oxide of silver,
        (ii) a mixture of an oxide of silver and an oxide of thallium,

(iii) a mixture of a oxide of silver and an oxide of cesium, and
(iv) a mixture of an oxide of silver, an oxide of thallium and an oxide of cesium.

2. Glass according to claim 1 characterised in that the proportion of alumina is 2 to 20 mole % and the proportion of modifying-metal oxides is 3–20 mole %.

3. The aluminosilicate optical glass according to claim 1, characterised in that it contains:
(a) 60–95 mole % of silica;
(b) at least 2 mole % of alumina; and
(c) at least 2 mole % of an oxide of silver.

4. The optical glass of claim 1 wherein said modifying metal component is a mixture of an oxide of silver and an oxide of thallium.

5. The optical glass of claim 1 wherein said modifying metal component is a mixture of an oxide of silver and an oxide of cesium.

6. The optical glass of claim 1 wherein said modifying metal component is a mixture of an oxide of silver, an oxide of thallium and an oxide of cesium.

* * * * *